US008302196B2

(12) United States Patent
Soderberg et al.

(10) Patent No.: US 8,302,196 B2
(45) Date of Patent: Oct. 30, 2012

(54) COMBINING ASSESSMENT MODELS AND CLIENT TARGETING TO IDENTIFY NETWORK SECURITY VULNERABILITIES

(75) Inventors: Joel M. Soderberg, Edmonds, WA (US); Bashar Kachachi, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 997 days.

(21) Appl. No.: 11/725,890

(22) Filed: Mar. 20, 2007

(65) Prior Publication Data
US 2008/0235801 A1  Sep. 25, 2008

(51) Int. Cl.
*G06F 11/00* (2006.01)
(52) U.S. Cl. .............. 726/25; 726/23; 726/26; 713/188; 709/224
(58) Field of Classification Search ............. 726/25, 726/11, 22, 23, 24; 709/224; 713/152, 187, 713/188, 189
See application file for complete search history.

(56) References Cited

U.S. PATENT DOCUMENTS

| | | | |
|---|---|---|---|
| 6,185,689 B1 | 2/2001 | Todd, Sr. et al. | |
| 6,226,372 B1 | 5/2001 | Beebe et al. | |
| 6,889,168 B2 | 5/2005 | Hartley et al. | |
| 6,952,779 B1 | 10/2005 | Cohen et al. | |
| 6,993,790 B2 | 1/2006 | Godwin et al. | |
| 7,096,503 B1 | 8/2006 | Magdych et al. | |
| 7,146,642 B1 | 12/2006 | Magdych et al. | |
| 7,162,649 B1 | 1/2007 | Ide et al. | |
| 7,761,918 B2* | 7/2010 | Gula et al. | 726/23 |
| 7,836,501 B2* | 11/2010 | Sobel et al. | 726/22 |
| 2001/0005889 A1 | 6/2001 | Albrecht | |
| 2001/0034847 A1* | 10/2001 | Gaul, Jr. | 713/201 |
| 2003/0154269 A1 | 8/2003 | Nyanchama et al. | |
| 2003/0212779 A1* | 11/2003 | Boyter et al. | 709/223 |
| 2004/0015728 A1* | 1/2004 | Cole et al. | 713/201 |
| 2004/0049698 A1 | 3/2004 | Ott et al. | |
| 2004/0078384 A1 | 4/2004 | Keir et al. | |
| 2004/0103309 A1 | 5/2004 | Tracy et al. | |
| 2004/0193918 A1* | 9/2004 | Green et al. | 713/201 |
| 2005/0005169 A1 | 1/2005 | Kelekar | |
| 2006/0101518 A1 | 5/2006 | Schumaker et al. | |
| 2006/0149848 A1 | 7/2006 | Shay | |
| 2007/0143851 A1* | 6/2007 | Nicodemus et al. | 726/25 |

OTHER PUBLICATIONS

Deraison et al., "Blended Security Assessments", Combining Active, Passive and Host Assessment Techniques, Tenable Network Security, Revision 9, Oct. 12, 2009, 12 pages.
International Search Report and Written Opinion Received for PCT Application No. PCT/US2008/057462, mailed on Jun. 29, 2009, 11 pages.
Wu, et al., "Integrated Vulnerability Management System for Enterprise Networks," 2005 IEEE International Conference on e-Technology, e-Commerce and e-Service (EEE '05), Mar. 29-Apr. 1, 2005, pp. 698-703.

(Continued)

*Primary Examiner* — Shewaye Gelagay

(57) ABSTRACT

Described is a technology for managing network security by having network clients that are capable of self-assessment assess themselves for security risks and/or security vulnerabilities. Other clients may be remotely assessed for security risks and/or security vulnerabilities. Assessments may include antimalware scans, vulnerability assessment, and/or port scans. The results of the self-assessments and remote assessments are combined into a data set (e.g., a view) indicative of the network security state. In this manner, for example, significant network resources are conserved by allowing those clients capable of self-assessment to assess themselves and thereafter only provide their self-assessment results. Clients capable of self-assessment may also be remotely assessed, to determine whether any discrepancies exist between their remote assessments and self-assessments. Clients may be discovered, along with their self-assessment capabilities, by network communication.

20 Claims, 6 Drawing Sheets

OTHER PUBLICATIONS

Chandrasekaran, et al., "AVARE: Aggregated Vulnerability Assessment and Response against Zero-day Exploits," 1st International Swarm Intelligence & Other Forms of Malware Workshop (Malware 2006), 2006, pp. 603-610.

Cisco Systems, "Managing Security Best Practices with the Cisco Self-Defending Network," 2005, 37 pages.

Stillsecure, "VAM—Vulnerability Management Platform", Retrieved on Dec. 8, 2006, from <http://www.stillsecure.com/vam/>, published 2006, 5 pages.

"nCircle Products—IP360 System Overview", Retrieved on Dec. 8, 2006, from <http://www.ncircle.com/index.php?s=products_ip360>, published 2006, 7 pages.

* cited by examiner

COMBINING ASSESSMENT MODELS AND CLIENT TARGETING TO IDENTIFY NETWORK SECURITY VULNERABILITIES

BACKGROUND

To identify security risks in an enterprise network environment, e.g., a corporate network, various vulnerability assessment techniques may be employed. However, only one targeting and assessment mechanism is typically utilized, such as periodically assessing a client computer's security mechanisms (e.g., antivirus software) and security patches when that client computer is connected to the corporate network. This allows for "risk assessment" savvy malware to possibly avoid detection by responding in a pre-described way to the assessment challenges.

Moreover, some machines are not always connected, whereby externally-initiated assessments are not feasible when machines are disconnected. While a client computer's security mechanisms and security patches can be assessed before the client computer is allowed to log onto the corporate network, the transient nature of connections for remote and mobile computers makes external assessment less than reliable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a first set of clients of a network that are capable of self-assessment to each self-assess for security risks and/or security vulnerabilities are directed to perform a self-assessment. A second set of clients of the network are remotely assessed for security risks and/or security vulnerabilities. The results of the self-assessments and remote assessments are combined into a data set indicative of security risks and/or security vulnerabilities of the clients of the network; the data set may be analyzed and/or stored in a database. In this manner, for example, significant network resources are conserved by allowing those clients capable of self-assessment to assess themselves and thereafter only provide their self-assessment results. Note that the first and second sets of clients are not necessarily mutually exclusive. Indeed, in one example implementation, a client capable of self assessment may also be remote assessed, with the results of both assessments compared in some way for further analysis, as described herein.

Assessments may include, for example, antimalware scans such as antivirus scan and/or an antispyware scan, as well as vulnerability assessment scans. Additional types of assessments may be performed, such as a port scan assessments; results of the port scan assessments may be combined with the self-assessment results and the other remote assessment results. A client that is capable of self-assessment may also be remotely assessed, with results of the remote assessment compared with the results of the self-assessment for that client to determine whether any discrepancy exists.

In one example implementation, a security server is associated with a server agent that communicates with clients configured with an agent for self-assessment to direct those clients to each perform a self-assessment. The security server is also associated with a remote assessment component to perform remote assessments on other clients. A network scanning engine associated with the security server may further perform unauthenticated inspections of client ports, which may be included in the combined data set. A reporting mechanism associated with the security server combines results of the self-assessments with the results of the remote assessments (and if desired, any port scan results) to provide a combined data set indicative of the network's security risks and/or security vulnerabilities. A server program such as a console may then provide a combined view of the combined data set.

In one example aspect, the security server communicates with clients to determine which clients are capable of self-assessment and which clients are not capable of self-assessment. Further, the security server may discover (harvest) the clients to be evaluated for any security risks and vulnerabilities, such as clients identified in a target set, including by name and/or IP address discovery.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards enterprise network security that in general operates by blending externally-initiated (remote) security assessment and local security assessment, such as on a scheduled basis. In this manner, computers on an enterprise network can be reliably targeted for risk and vulnerability detection, that is, assessed and made responsive to security challenges.

For example, a corporate employee's laptop computer can perform self-assessment for vulnerabilities on a regular schedule, with the resultant state reported on the next connection to the corporate network. While the laptop is connected, external assessments can also target the laptop for immediate reporting. A hybrid model that uses some of the local assessment results and some of the remote assessment results may also be implemented. A subsequent agent may take the results of the local and remote assessment and cross-check the results for better consistency and to detect malware that attempts to conceal its presence to the local or remote assessment.

As one advantage, intelligent application of the targeting of hosts for assessment reduces the amount of network traffic and resource utilization of the corporate assessment infrastructure. For example, if half of the hosts connected to the network are capable of self-assessment, then the shared corporate resources required for remote assessment are reduced by roughly half. Such resources and bandwidth are costly in the corporate environment and better utilization is thus beneficial.

While the present invention is described with various examples, such as in a corporate network environment in which various servers perform various roles with respect to client management and security assessment, it is understood that this is only one example environment. For example, in one implementation the client computer is part of a domain when connected, however the blended model described herein may be used in other types of networks. Further, some or all of the services provided by the various servers may be combined into a lesser number of servers, or may be further separated into additional servers.

As such, the present invention is not limited to any particular embodiments, aspects, concepts, structures, protocols, functionalities or examples described herein. Rather, any of the embodiments, aspects, concepts, protocols, structures, functionalities or examples described herein are non-limiting, and the present invention may be used various ways that provide benefits and advantages in computer and/or network security in general.

Figure 1:
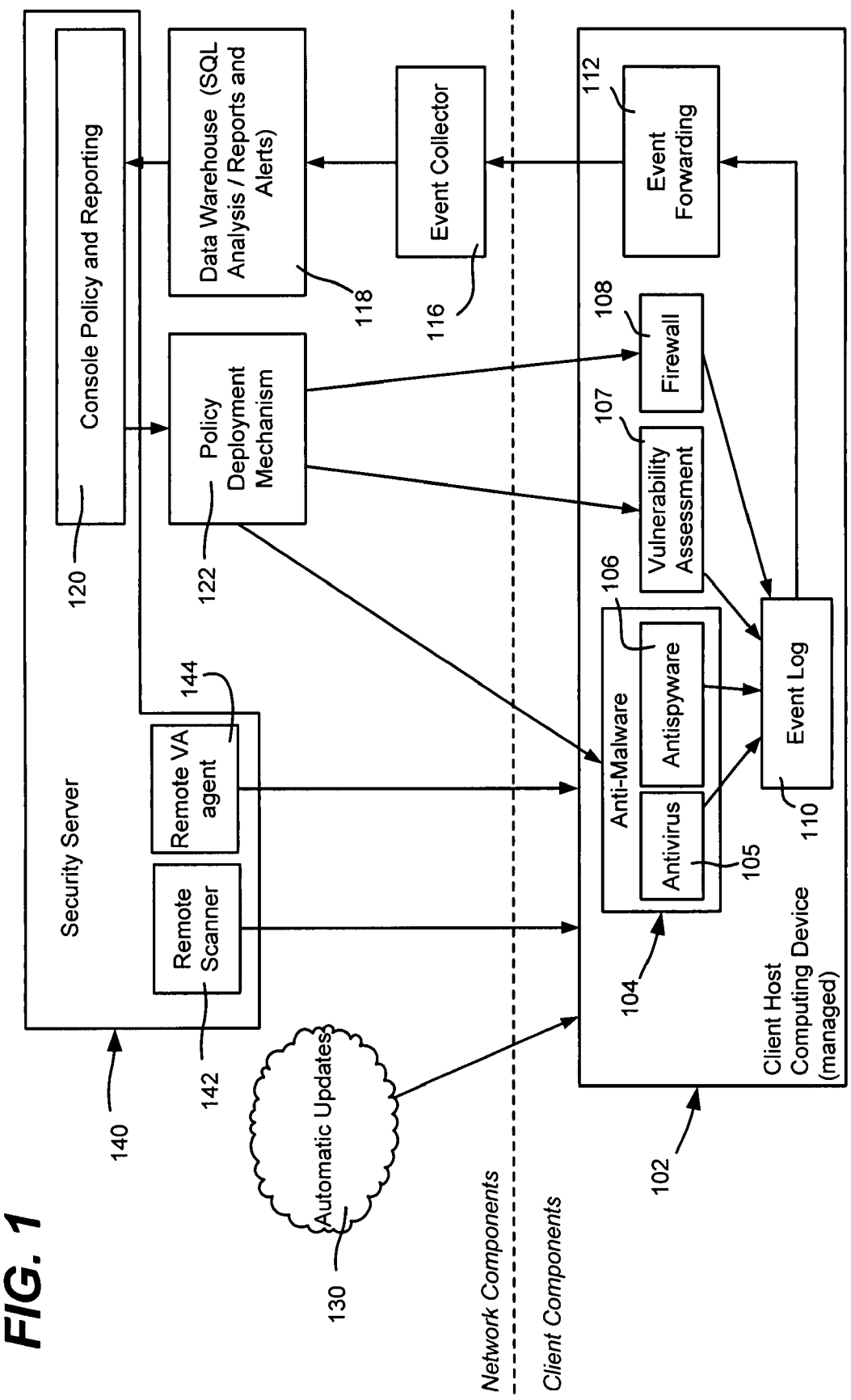
FIG. 1 shows an illustrative example block diagram of network and client components in which the client components are managed to perform a self-assessment of security risks and/or security vulnerabilities.

FIG. 1 shows an example, conceptual security infrastructure in which a network components (above the dashed line) work in association with client components exemplified within a client host computing device 102 to detect security vulnerabilities. In general, the client host computing device 102 contains independent security mechanisms 104-108 that collect security related data into an event log 110. Example mechanisms shown in FIG. 1 include antimalware component 104 (e.g., comprising antivirus software 105 and anti-spyware software 106), a vulnerability assessment component 107 (e.g., which checks computer state and health) and a firewall component 108.

In general, the host 102 is configured to perform local self-assessment scans, and via an event forwarding mechanism 112, provide the results from the event log 110 to an event collector 116 of the network. Although only one client host device 102 is shown in FIG. 1, it is understood that many such client host devices may be present in a given network and similarly configured.

The collected events are stored in a data warehouse 118 (e.g., a SQL server) for analysis and reporting, and alerts may be sent based on the detected events. A network administration console 120 or the like (e.g., SQL reporting services) allows a security administrator to view reports and also to author security policy, which is then deployed via a policy deployment mechanism 122, such as group policy. For example, via policy, a particular firewall port or the like may be blocked, certain antimalware signatures may be required, certain versions of security patches may be specified, and so forth. The client host 102 may couple to an automatic updates service 130 or the like to obtain the files and/or settings necessary to comply with the policy.

As also represented in FIG. 1, a security server 140 is able to remotely assess the client host device 102 when the client host device 102 is connected to the network. To this end, a remote scanner 142 and remote vulnerability assessment agent 144 can remotely scan the host device 102 for antimalware and perform other vulnerability tests, respectively. Examples of other tests include checking which security programs and security patches are installed, attempting to connect to a print spooler, sending packets to see which ports respond, and so forth. Scanning and vulnerability assessment are further described below with reference to FIG. 3.

Figure 2:
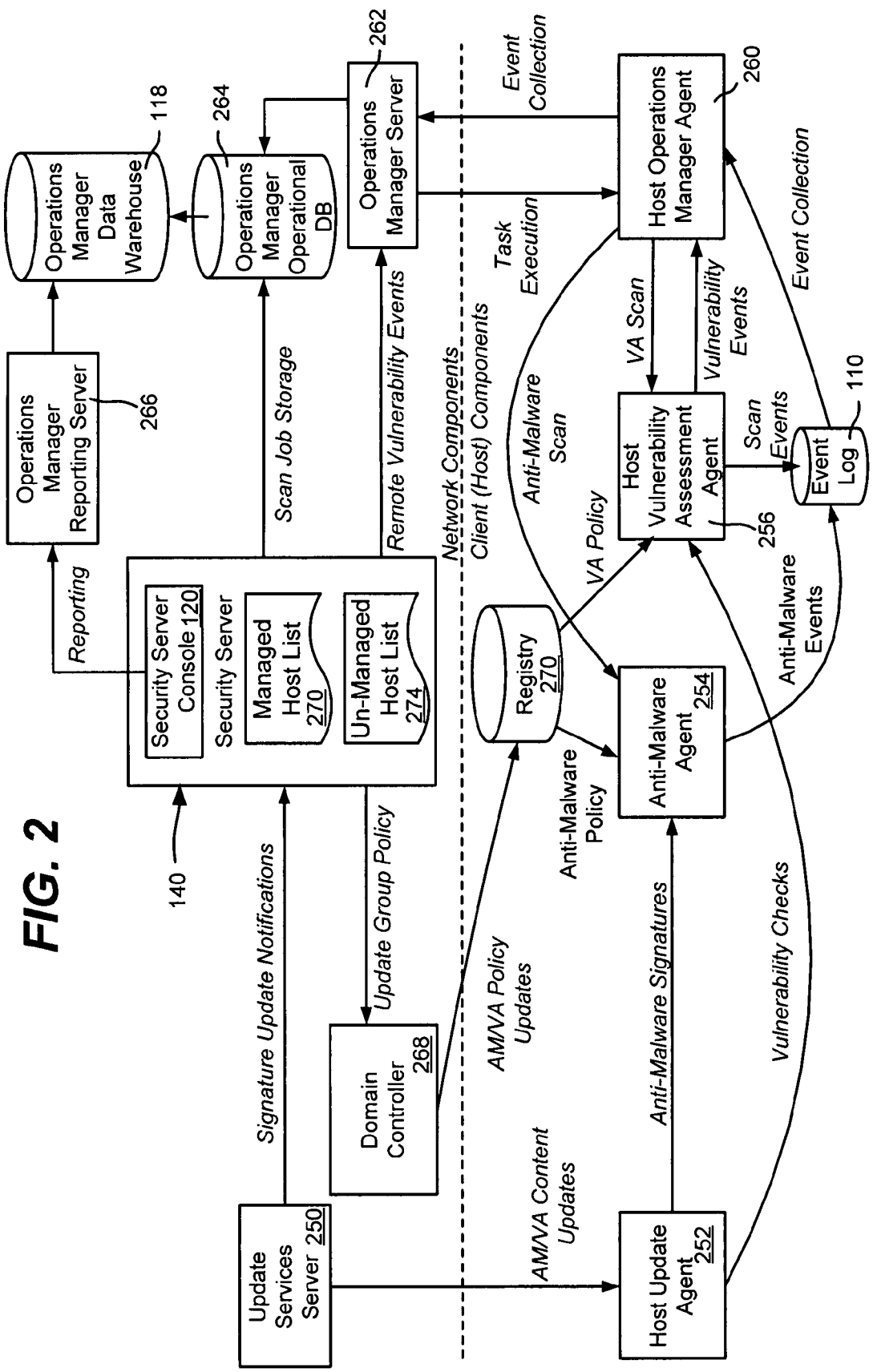
FIG. 2 shows an example implementation block diagram of network and client components in which the client components are managed to perform a self-assessment of security risks and/or security vulnerabilities.

FIG. 2 provides an example network domain-based implementation having more particularly-identified components that operate as generally described in FIG. 1. For example, the signature and/or patch updates are provided by an update services server 250 to a host update agent 252, which in turn provides the signatures and vulnerability checking information to an antimalware agent 254 and host vulnerability assessment agent 256 (corresponding to the software code 104 and 107 referenced in FIG. 1, respectively).

In FIG. 2, the event forwarding and collection mechanisms (114, 116 of FIG. 1) are exemplified as being incorporated into a host operations manager agent 260 and operations manager server 262, respectively. The operations manager server 262 stores the results in an operational database 264 for later storing in the warehouse 118. Note that a reporting server 266 is exemplified in the embodiment of FIG. 2, e.g., separate from the security server 140.

As also represented in FIG. 2, in this example implementation, group policy changes are provided (e.g., from the security server 140) to a domain controller 268, and then written into a client registry 270. The antimalware agent 254 and host vulnerability assessment agent 256 read the registry 270 such that their respective assessments will comply with the security policy.

To facilitate efficient vulnerability assessment, the security infrastructure (e.g., accessible to the security server 140) maintains a list 272 (or other suitable data structure) of hosts that are managed by the security system, along with a list 274 of those that are unmanaged. These lists 272, 274 also contain the information needed to know whether or not each host is capable of self-assessment with respect to security vulnerability. For hosts that are capable of self-assessment, the security infrastructure directs the client host to scan itself and report any logged events, as described above. Hosts that are not capable of self-assessment are assessed (scanned and/or otherwise evaluated) remotely.

Note that hosts that are capable of self-assessment can also be assessed remotely, such as according to a schedule or on demand. Thus, the set of clients that is remotely assessed may at times contain one or more clients that are also capable of (and possibly scheduled for) self-assessment. For example, one advantage to remote assessment of a managed host is to cross-check for differences or discrepancies between the results of the self-assessment and the remote assessment scans. Any discrepancies may be used to detect anomalies, which might, for example indicate that "assessment-savvy" malware that can avoid detection by one type of scan but not the other, such as a rootkit or the like, may be present on an assessed managed host machine.

For on-demand scan requests initiated from the security server operations console 120 (e.g., requests where the security administrator has chosen to assess the state of one or more managed hosts in the network), the set of target machines may be cross-referenced with the managed host list 270 to determine if the target machine is capable of self-assessment. If not, the security server initiates a remote and/or unauthenticated assessment of the host. For those hosts capable of self-assessment, the security server 140 may use the results from previously scheduled or on-demand assessments to evaluate the risk or vulnerabilities of the system.

The security server administrator is also able to target one or more machines for remote and/or unauthenticated assessment as well as self-assessment as a mechanism for deeper inspection of host targets on a regular basis. The results from the various forms of assessments can be correlated, summarized and viewed for more detailed analysis by the security server administrator or other security analysts.

Figure 3:
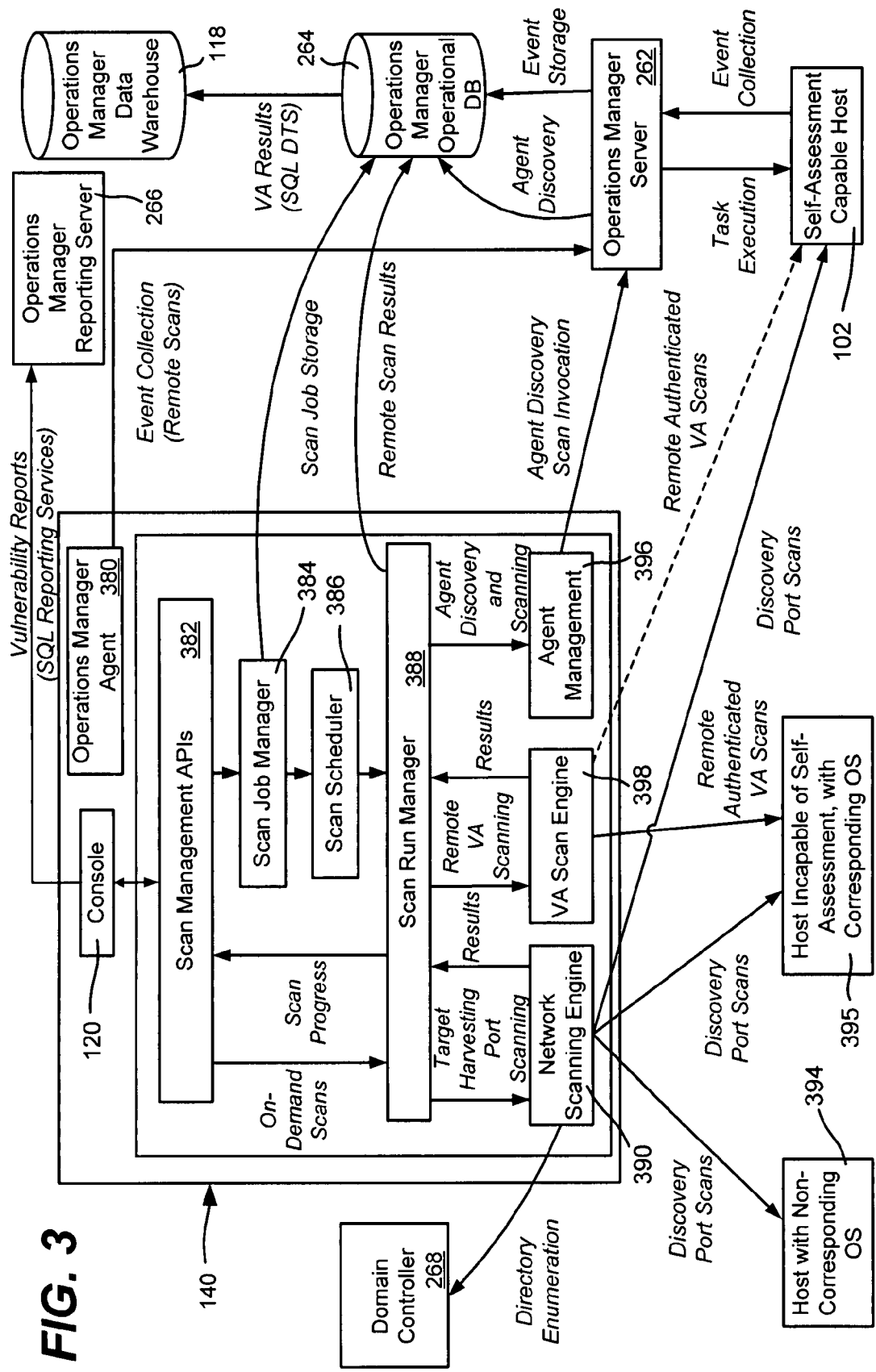
FIG. 3 shows an example implementation in which network components include remote security assessment mechanisms for combining with self-assessment results of clients to provide a combined data set indicative of security risks and/or security vulnerabilities.

FIG. 3 is an example block diagram generally representative of the remote scanning components and the components that schedule self-assessment of managed hosts. The example implementation depicted in FIG. 3 is conceptually similar to that of FIGS. 1 and 2, but provides additional information on network scanning and management components and functionality.

In general, the security server 140 includes the console 120 and an operations manager agent 380 that deals with remote scans. Scan management APIs 382 allow an administrator to set up scan jobs via a scan job manager 384 (on demand or according to a scan scheduler 386), and be run by a scan run manager 388.

One concept represented in FIG. 3 is target harvesting, in which a target set of hosts to be assessed, as specified in a scan job, is resolved to a list of reachable (currently connected) hosts. A network scanning engine 390 can discover connected hosts via port scanning, including unmanaged (agent-less) hosts 392 that have operating systems that do not correspond to the network operating system, unmanaged (agent-less) hosts with corresponding operating systems 394, and managed hosts such as the managed host 102 of FIGS. 1 and 2.

Agent discovery, represented by the agent management component 396, determines the subset of reachable hosts obtained from target harvesting that have the agent deployed. In FIG. 3, agent-scan invocation refers to triggering an agent-based scanning of the checks specified in the scan job to the agent-managed subset of reachable hosts.

Another type of scanning that may be performed is unauthenticated scanning, which performs port-scanning across all discovered (managed and unmanaged) hosts for the set of ports specified in the scan job being run. In this way, it can be determined on which ports hosts are responding, which can correspond to vulnerabilities.

As also represented in FIG. 3, a vulnerability scan engine 398 performs remote authenticated vulnerability scanning as specified in the scan job for the agent-less subset 395 of discovered hosts. For example, the programs and security patches currently residing on a host may be evaluated. As described below, remote authenticated vulnerability assessment scanning can also be performed on a managed host 102 if the vulnerability assessment scan (performed by default by the managed host's agent) is overridden by an administrator.

The results returned by the network scanning engine 390 for discovery and port scans, and by the vulnerability assessment scan engine 398 for remote authenticated scans are then available for automated and/or manual analysis. For example, raw results may be transformed into XML formats compatible with the database schemas for results tables, and stored by inserting the various scan results into corresponding tables, e.g., in the data warehouse 118.

As can be seen, different types of scans are thus supported by the exemplified security infrastructure, including discovery scans/port scans (unauthenticated remote), and authenticated agent-based antimalware scans. A vulnerability assessment scan can be remote or host agent-based, depending on whether an agent is available or whether an administrator wants to force a remote vulnerability assessment scan.

Figure 4:
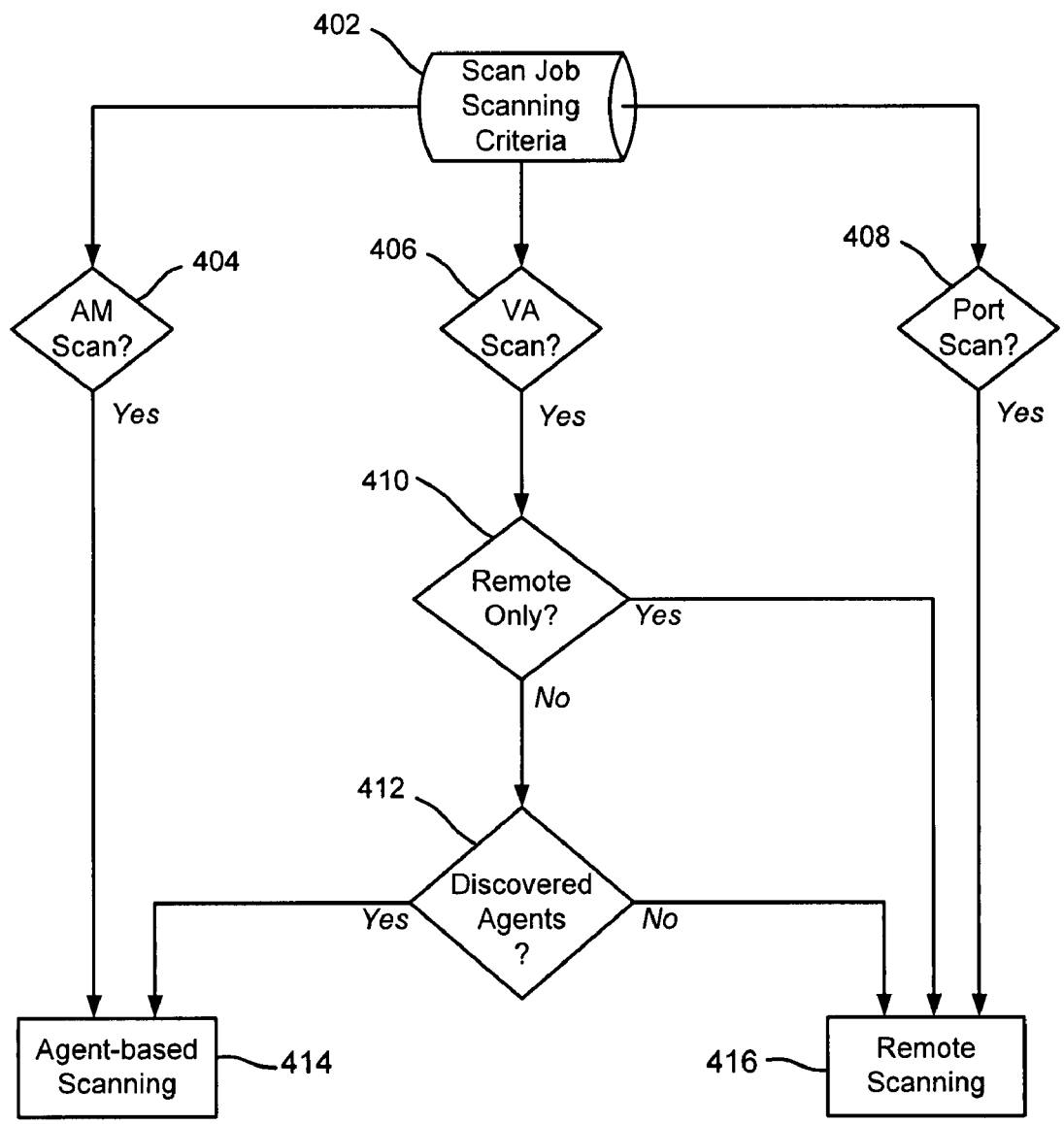
FIG. 4 a flow diagram representing example steps to perform combined self-assessments and remote assessments into a combined data set indicative of security risks and/or security vulnerabilities.

FIG. 4 illustrates example selection logic for the above-described scanning paradigms in security server scan processing. The diagram defines the selection logic based on the criteria 402 defined in a scan job. One of three scans are specified, an antimalware scan (as represented via step 404), a vulnerability assessment scan (as represented via step 406), or a port scan (as represented via step 408. As seen in FIG. 4, the scanning methodology for vulnerability assessment scans depends on the availability of agents (as evaluated at step 412) for processing the scan request. In the event that agents are available, they will be preferred for processing vulnerability assessment scans at step 414. Remote scanning (Step 416) is used as a fallback mechanism in the event that targets (hosts to be scanned) are discovered to be agent-less. Note that step 410 provides a way to opt out of the default scanning selection logic through configuration of a "Remote Only" switch in the scan job criteria.

Figure 5:
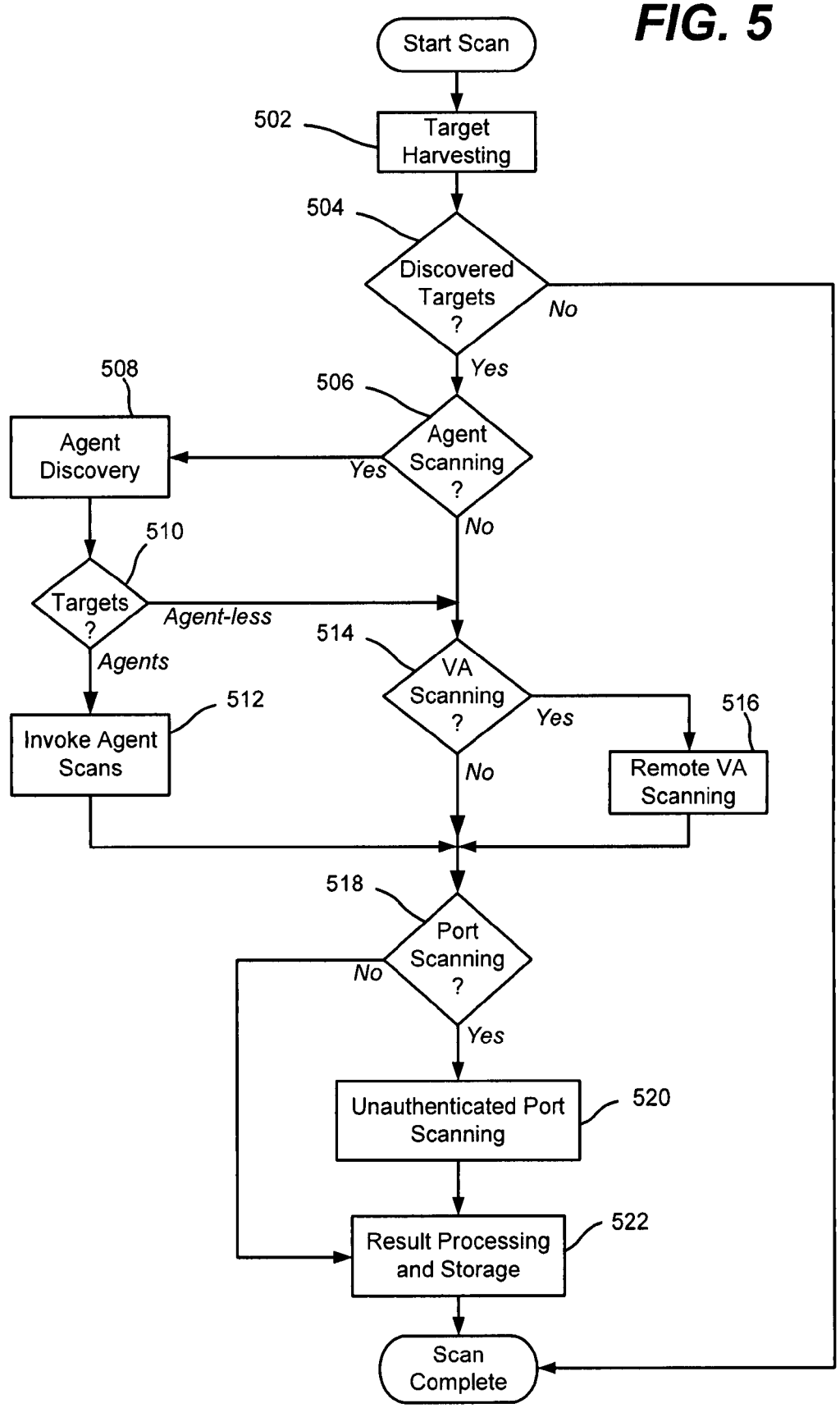
FIG. 5 is a flow diagram representing example steps taken to locate targets for self-assessments and remote assessments of security risks and/or security vulnerabilities.

FIG. 5 defines an example workflow diagram for scan runs based on the criteria specified in their corresponding scan jobs, beginning at step 502 which represents harvesting for targets to scan, as generally described below with reference to FIG. 6. If targets are discovered at step 504, the workflow process continues to step 506, otherwise it ends.

Step 506 determines whether agent (local) scanning is a chosen option (e.g., by an administrator), and if so branches to step 508 to discover which targets have agents. For agent discovery, the operations manager infrastructure may be used to determine the availability of agents for processing target scan run requests. In general, the agent discovery sub-process in scan run execution includes agent enumeration to determine which set of hosts on which have the components that are required for processing scan requests, and target set correlation, which refers to the computation of agent distribution across the population of targets harvested for the given scan run, using the results of agent enumeration and target harvesting. For example in one implementation, an administration class provides the capability to enumerate the complete set of hosts known by the operations manager server 262 Server to be managed by operations manager agents.

The intersection of the two sets is the subset of the scan target population that is known to be agent-managed, whereby agent-based vulnerability assessment scans may be triggered for this subset of machines. The set difference that is calculated by subtracting the intersection from the scan targets set represents the agent-less subset of the scanning population. This is the subset for which remote VA scanning may be employed during scan run execution.

Note that after agent discovery at step 508, the creation of a custom script for performing the set of scanning operations specified by the scan job is typically performed. Note that because the vulnerability assessment scan criteria is not known until the scan job has been authored, agent-based scans cannot be built on top of static scripts, and thus a typical approach is to dynamically create a script containing the information required to trigger the host tasks with the appropriate scanning criteria. This may be done by substituting scanning parameters into a script template to form a complete script for custom task execution.

Returning to FIG. 5, if there are one or more agents, step 512 is executed to invoke agent scanning (for those with agents). For those targets without agents (agent-less), the process branches to step 514 to determine whether vulnerability assessment scanning has been chosen; if so step 516 is performed to remotely vulnerability assess those targets. Note that some throttling may be performed, e.g., to scan a limited number of clients at a time.

Step 518 evaluates whether port scanning is to be performed. Note that this is done remotely, by sending unauthenticated communications to various client ports to determine which ones respond. If port scanning has been chosen, step 520 is performed to scan those ports. For example, UDP port scans, TCP SYN scans, and TCP connect scans may be performed on the clients.

Step 522 represents processing the results and storing them. Note that step 522 is for either local scan data that was collected as events, for remote scan data collected by the server, or both. As described above, processing and storing the results may comprise transforming raw results into XML or other formats compatible with the database schemas for results tables, and stored by inserting the various scan results into corresponding table. Note that processing may also send alerts or take other actions, such as to immediately disconnect any machine from the network if it endangers security.

Turning to the aspect of harvesting, in one example implementation, there are two main types of target harvesting implemented by the security server for scanning. A first type is name-based harvesting, which is used to reduce target sets down to individual host names for which reachability can be verified. A second type is address-based harvesting, in which network addresses are first discovered before they are mapped to host names.

Figure 6:
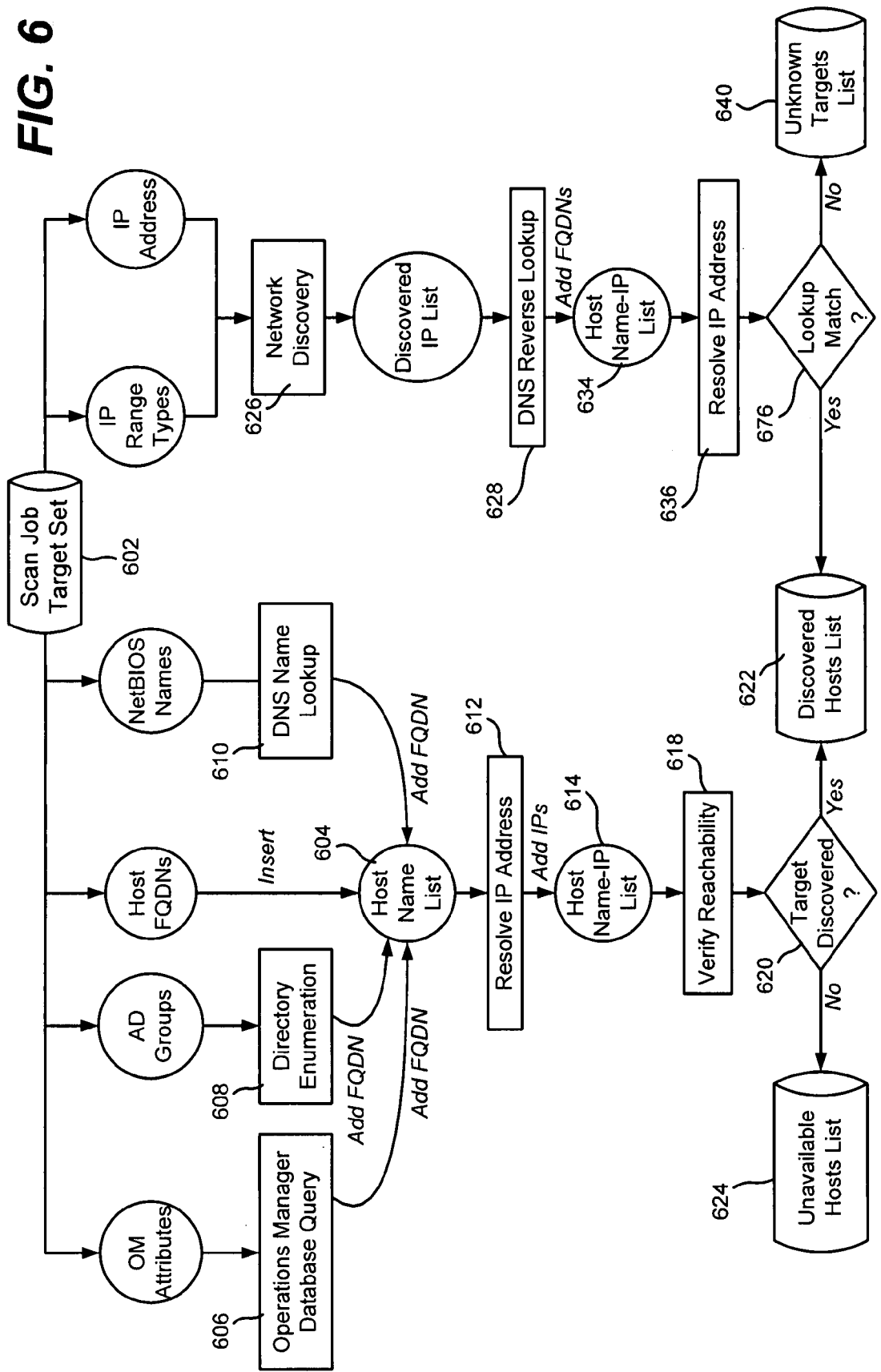
FIG. 6 is a representation of discovering client targets for assessment of security risks and/or security vulnerabilities.

FIG. 6 represents an example logical workflow for name-based harvesting and address-based harvesting when given a scan job target set 602. Name-based harvesting may include building a host list 604, e.g., by collecting the set of scan job targets corresponding to host names and adding them to a host list. In general, the items to the left side of the scan job target set 602 correspond to name-based harvesting concepts, while those to the right correspond to address-based harvesting concepts As represented in FIG. 6, operations manager enumeration executes a query 606 against an operations manager computer attributes table maintained in the operational database 264 to obtain any entries in which the attribute name matches the target type and the attribute value matches the target value specified by the scan job 602. More particularly, computer attributes may be used to limit the scope of enumeration to only those hosts with vulnerability assessment agents and/or antimalware agents. Note that computer attributes are provided by operations manager server for registry-based service discovery, and may be publicly exposed through the administration class. To this end, computer attributes can be used to specify the discovery of certain registry keys which indicate the presence of agent managed client components. For example, clients can have a registry value indicating the version of the vulnerability assessment agent currently installed, and/or a registry value indicating the version of the antimalware agent currently installed. Similarly, service discovery can be used to further scope agent discovery to the subset of hosts for which the vulnerability assessment agent and antimalware agents are both installed and in a healthy state. For example, service discovery scripts can be used to periodically query for whether the assessment agent and antimalware agents services are started, and may be further used to generalized to monitor any health-related instrumentation points that may be used as criteria for refined agent discovery.

Returning to another aspect represented in FIG. 6, directory enumeration 608 expands the container objects for Active Directory (AD) groups specified as scan job targets into the computer objects which they contain. Other names may be obtained from fully qualified domain names (FQDN) of hosts, and from NetBios named obtained via DNS name lookups 610. The corresponding host names are added into the host list 604.

Block 612 represents resolving the names in the list 604 into their IP addresses, creating a new list 614. Step 616 verifies the reachability (or not), e.g., using the network scanning engine 390 (FIG. 3, described above) to invoke a network scan, via the aggregated host list 614 used as the target specification. Step 620 represents result processing to split the result set into two subsets corresponding to discovered hosts 622 and unavailable hosts 624.

Address-based harvesting is represented via step 626, comprising network discovery which uses the network scanning engine 390 to invoke a scan for the network enumeration command, supplying the IP-based target specifications in the scan job 602 as input.

To determine host names, the network scanning engine 390 may perform a DNS reverse-lookup operation 628 on the set of discovered addresses, to map them to their corresponding host names in a list 634. To verify lookup consistency, that is, to verify the consistency of DNS records, a DNS forward-lookup operation may be performed to resolve the mapped-to host names to their corresponding IP addresses, as represented via step 636. Result processing is represented via step 638, which splits the result set into two subsets, adding successfully-verified host names to the existing list 622 of discovered hosts, and marking the rest as unknown targets 640. The discovery results are thus merged in the list 622 as a unified list of harvested hosts.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a network that includes a server and a plurality of client computing devices communicatively coupled thereto, a method performed by the server comprising:
    performing unauthenticated inspection of ports corresponding to each client computing device in a first set of client computing devices and each client computing device in a second set of client computing devices;
    harvesting the first and second set of client computing devices from a target set of client computing devices to assess, the harvesting step including discovering at least some of the client computing devices in the first and second sets of client computing devices by name or by IP address;
    communicating with the first set of client computing devices in the plurality of client computing devices, each client computing device in the first set of client computing devices including one or more components operable to independently perform a self-assessment process that identifies security risks and security vulnerabilities of the client computing device in the first set of client computing devices that includes the component(s);
    directing the component(s) included in each client computing device in the first set of client computing devices to perform the self-assessment process;
    obtaining a first set of data corresponding to results of the self-assessment processes performed by the component(s) included in the client computing devices in the first set of client computing devices;

performing a remote assessment process on the server to identify security risks and security vulnerabilities of the second set of client computing devices in the plurality of client computing devices to obtain a second set of data corresponding to results of the remote assessment process;

performing a further remote assessment process on the server to identify security risks and security vulnerabilities of a selected client computing device in the first set of client computing devices to obtain a third set of data corresponding to results of the further remote assessment process; and using the first set of data, the second set of data, and the third set of data to determine security risks and security vulnerabilities in the network, including comparing the third set of data against the first set of data to determine, for the selected client computing device, whether any discrepancy exists between the results of the further remote assessment process and the results of the self-assessment process performed by the component(s) included in the selected client computing device.

2. The method of claim 1 wherein directing the component(s) included in each client computing device in the first set of client computing devices to perform the self-assessment process comprises instructing the component(s) included in each client computing device in the first set of client computing devices to perform an antimalware scan including an antivirus scan or an antispyware scan, or both an antivirus scan and an antispyware scan.

3. The method of claim 1 wherein directing the component(s) included in each client computing device in the first set of client computing devices to perform the self-assessment process comprises instructing the component(s) included in each client computing device in the first set of client computing devices to perform a vulnerability assessment scan.

4. The method of claim 1 wherein performing the remote assessment process to identify security risks and security vulnerabilities of the second set of client computing devices comprises performing a remote antimalware scan, including an antivirus scan or an antispyware scan, or both an antivirus scan and an antispyware scan.

5. The method of claim 1 wherein performing the remote assessment process to identify security risks and security vulnerabilities of the second set of client computing devices comprises performing a remote vulnerability assessment scan.

6. The method of claim 1 wherein obtaining the first set of data comprises collecting events from an event log associated with each client computing device in the first set of client computing devices.

7. The method of claim 1 wherein using the first set of data, the second set of data, and the third set of data to determine the security risks and security vulnerabilities in the network comprises formatting the first and second sets of data into a data format corresponding to a database storage format, and storing the formatted data in a database.

8. A system comprising:

a plurality of client computing devices;

a server communicatively coupled to the plurality of client computing devices, the server including:

a network scanning engine that performs unauthenticated inspections of ports corresponding to each client computing device in a first set of client computing devices and each client computing device in a second set of client computing devices;

the network scanning engine further configured to harvest the first and second sets of client computing devices from a target set of client computing devices to assess, the harvest including discovering at least some of the client computing devices in the first and second sets of client computing devices by name or by IP address;

a server agent that communicates with the first set of client computing devices in the plurality of client computing devices, each client computing device in the first set of client computing devices including a client agent that independently performs a self-assessment process that determines security risks and security vulnerabilities of the client computing device in the first set of client computing devices that includes the client agent responsive to the communication from the server agent;

a remote assessment component that performs a remote assessment process to determine security risks and security vulnerabilities of the second set of client computing devices in the plurality of client computing devices, the remote assessment component performing a further remote assessment process to identify security risks and security vulnerabilities of a selected client computing device in the first set of client computing devices;

a reporting mechanism that combines results of the self-assessment process performed by the client agents of each client computing device in the first set of client computing devices with results of the remote assessment process to provide a combined data set indicative of security risks and security vulnerabilities of the plurality of client computing devices; and a network scanning engine that communicates with each client computing device in the plurality of client computing devices to determine which client computing devices include a client agent that performs the self-assessment process and which client computing devices do not include a client agent that performs the self-assessment process;

the server configured to compare results of the further remote assessment process against results of the self-assessment process performed by the client agent included in the selected client computing device to determine whether any discrepancy exists in the results for the selected client computing device.

9. The system of claim 8 wherein the reporting mechanism includes means for collecting the results of the self-assessment process performed by the client agents of each client computing device in the first set of client computing devices, and a server program that provides a combined view of the combined data set.

10. The system of claim 8, wherein the self-assessment process independently performed by the client agent in each client computing device in the first set of client computing devices comprises performing an antimalware scan including an antivirus scan or an antispyware scan, or both an antivirus scan and an antispyware scan.

11. The system of claim 8, wherein the self-assessment process independently performed by the client agent in each client computing device in the first set of client computing devices comprises performing a vulnerability assessment scan.

12. The system of claim 8, wherein the remote assessment process performed by the remote assessment component comprises performing a remote antimalware scan, including an antivirus scan or an antispyware scan, or both an antivirus scan and an antispyware scan.

13. The system of claim 8, wherein the remote assessment process performed by the remote assessment component comprises performing a remote vulnerability assessment scan.

14. In a network that includes a server and a plurality of client computing devices communicatively coupled thereto, a method performed by the server comprising:

performing unauthenticated inspection of ports corresponding to each client computing device in a first set of client computing devices and each client computing device in a second set of client computing devices;

harvesting the first and second set of client computing devices from a target set of client computing devices to assess, the harvesting step including discovering at least some of the client computing devices in the first and second sets of client computing devices by name or by IP address;

managing the first set of client computing devices in the plurality of client computing devices, each client computing device in the first set of client computing devices including one or more components that independently perform a self-assessment process to determine security risks and security vulnerabilities of the client computing device in the first set of client computing devices that includes the component(s) responsive to communication received from the server;

obtaining a first set of results corresponding to the self-assessment processes performed by the component(s) included in the client computing devices in the first set of client computing devices;

remotely assessing security risks and security vulnerabilities of the second set of client computing devices in the plurality of client computing devices to obtain a second set of results corresponding to the remote assessments;

remotely assessing security risks and security vulnerabilities of a selected client computing device in the first set of client computing devices to obtain a third set of results;

combining the first, second, and third sets of results into a combined data set indicative of security risks and security vulnerabilities of the first and second sets of the client computing devices in the plurality of client computing devices, including comparing results of the remote assessment of the selected client computing device against results of the self-assessment process performed by the component(s) included in the selected client computing device to determine whether any discrepancy exists in the results for the selected client computing device; and communicating with each client computing device in the plurality of client computing devices to determine which client computing devices include the component(s) that perform the self-assessment process and including the client computing devices in the first set of client computing devices, and to determine which client computing devices do not include the component(s) that perform the self-assessment process and including those client computing devices in the second set of client computing devices.

15. The method of claim 14, wherein the self-assessment process independently performed by the one or more components in each client computing device in the first set of client computing devices comprises performing an antimalware scan including an antivirus scan or an antispyware scan, or both an antivirus scan and an antispyware scan.

16. The method of claim 14, wherein the self-assessment process independently performed by the one or more components in each client computing device in the first set of client computing devices comprises performing a vulnerability assessment scan.

17. The method of claim 14, wherein remotely assessing security risks and security vulnerabilities of the second set of client computing devices in the plurality of client computing devices comprises performing a remote antimalware scan, including an antivirus scan or an antispyware scan, or both an antivirus scan and an antispyware scan.

18. The method of claim 14, wherein remotely assessing security risks and security vulnerabilities of the second set of client computing devices in the plurality of client computing devices comprises performing a remote vulnerability assessment scan.

19. The method of claim 14, wherein obtaining the first set of results comprises collecting events from an event log associated with each client computing device in the first set of client computing devices.

20. The method of claim 14, wherein combining the first, second, and third sets of results into a combined data set indicative of security risks and security vulnerabilities in the network comprises formatting the first and second sets of results into a data format corresponding to a database storage format, and storing the formatted data in a database.

* * * * *